May 2, 1967

YOHAN CHO

OSCILLATOR INCLUDING A TUNNEL DIODE AS A TWO-LEVEL SWITCH

Filed July 15, 1965

3,317,855

INVENTOR.
YOHAN CHO
BY Robert T Dunn
ATTORNEY 3,317,855

OSCILLATOR INCLUDING A TUNNEL DIODE AS A TWO-LEVEL SWITCH

Yohan Cho, Harvard, Mass., assignor to Massachusetts Institute of Technology, Cambridge, Mass., a corporation of Massachusetts Filed July 15, 1965, Ser. No. 472,186
10 Claims. (Cl. 331—111)

This invention relates to oscillators and more particularly to a circuit for generating pulses of a predetermined rate.

Oscillators generally include an amplifier energizing a resonant circuit with positive feedback from the resonant circuit to the input of the amplifier. The resonant circuit stores oscillatory energy of a particular frequency, and so current or voltage excursions of the particular frequency in the resonant circuit are of relatively large amplitude compared to excursions of other frequencies which are attenuated in the resonant circuit. Such resonant circuits usually include inductive and capacitive elements in combination. The feedback is positive because it is in phase with the conductive state of the amplifier and tends to augment the conductive state of the amplifier rather than oppose it.

It is one object of the present invention to provide an oscillator without the usual forms of resonant circuit.

It is another object to provide an oscillator in which feedback does not necessarily augment the conductive state of the amplifier.

It is another object to provide an oscillator employing relatively simple binary circuits of relatively broad frequency response with feedback means such that the circuits switch between binary operating levels at a predetermining selected oscillation rate.

Other advantageous features of the present invention are evident by comparison with matched filter networks currently in use.

Matched filter networks have been employed in pulse compression radar systems for generating a set of coded pulses in response to an input pulse. The coded pulses are amplified by a transmit system which energizes an antenna, producing radiation which is directed to a target. Echo radiation from the target is detected by the antenna, which energizes a receiver producing received pulses. The received pulses are then fed to the same filter network, which cooperates with other circuits to produce the autocorrelation function of the received pulses. The filter network in such pulse compression radar systems responds to a single input pulse and produces a train of pulses which are specially coded. It has been the practice to employ either a plurality of separate delay elements to generate the train of pulses, or to employ a multi-tapped delay line to produce the train of pulses. Generally, such filter networks are comprised of passive elements, and so the pulses in the train are progressively substantially attenuated in comparison with the initiating pulse. Furthermore, the numbers of pulses in each train are fixed and determined by the number of individual delays in the circuit or by the number of taps on the tapped delay line, when such is used. Thus, the filter network responds to the initiating pulse in much the same manner as a ringing circuit, producing a limited number of pulses or excursons of decreasing amplitude.

It is one object of the present invention to provide a circuit for producing an unlimited train of pulses of substantially uniform amplitude in response to an initiating input signal.

It is another object of the present invention to provide a circuit for producing a train of pulses in response to a single input pulse employing a single delay element for establishing the spacing between the pulses in the train.

It is another object to provide a circuit for producing a train of pulses in response to an input signal, and in which the duration of the train of pulses and the interval between pulses in the train are readily variable.

It is another object to provide a circuit for producing bursts of variable spaced pulses in response to an input signal, the duration of each burst being determined by the interval of the input signal.

The various embodiments of the present invention all have a feedback circuit including a delay element. The principal elements of the circuit are: a differential amplifier responsive to the input signal and the feedback signal which produces a signal level indicative of the difference between the input and feedback signal for controlling a switching circuit. The output of the switching circuit suitably amplified is the output train of pulses and is applied to the delay element, which produces the feedback signal. In operation, the excursions of the feedback signal are preferably greater than twice the amplitude of the input signal, so that the differential changes sign with each excursion. The switching circuit responds by switching at each change in the sign of the differential, and so the cycle repeats. The cycle keeps repeating at an interval established by the delay element for the duration of the input signal. Thus, a burst of pulses is produced at the output, the duration of the burst being determined by the duration of the input signal and the interval between pulses in the burst being determined by the interval of the delay element.

Other features and objects of the present invention will be apparent from the following specific description taken in conjunction with the figures in which.

Figure 1:
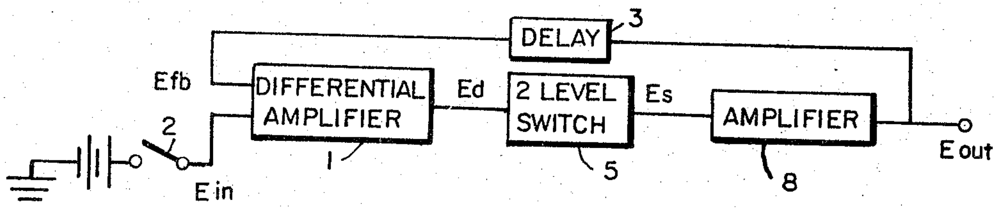
FIG. 1 is a block diagram of the pulse generating circuit to illustrate the major parts thereof.
Figure 2:
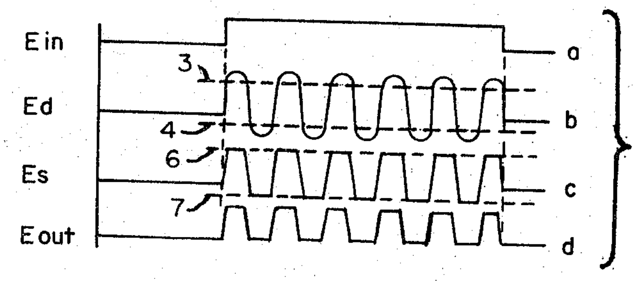
FIG. 2 illustrates idealized waveforms as an aid to understanding the operation of the circuit in FIG. 1.

Turning first to FIG. 1, there is shown a block diagram of the pulse generating circuit, including functional blocks to illustrate the principles of operation of the circuit. These include a differential amplifier 1 which is responsive to two signals denoted $E_{in}$ and $E_{fb}$. $E_{in}$ is the input control signal produced by, for example, closing a switch 2, and holding the circuit closed for a desired duration and finally opening the switch. The general form of the signal $E_{in}$ is illustrated in the waveform of FIGURE 2*a*. As illustrated, the pulse $E_{in}$ is a positive pulse. The other input to the differential amplifier, $E_{fb}$, is obtained from the feedback circuit, including delay element 3. $E_{fb}$, as will be seen, is intermittent.

During the interval of the input signal $E_{in}$ the amplitude of the output of the differential amplifier 1 swings between two different levels 3 and 4, depending upon which, $E_{in}$ or $E_{fb}$, is of greater magnitude. The output of the differential amplifier denoted $E_d$ appears as illustrated by the waveform in FIGURE 2*b*, and controls the two-level switching circuit 5 which operates at one or the other of two levels in response to excursions of the signal $E_d$ beyond the levels 3 and 4. The output of the switching circuit denoted $E_s$ is illustrated by the waveform in FIGURE 2*c* and swings sharply between the two switch levels 6 and 7. This output is amplifier by a buffer amplifier 8, which produces pulses illustrated in the waveform of FIGURE 2*d*. The gain of the amplifier is preferably such that the magnitude of the output pulses is at least twice the magnitude of the input signal level $E_{in}$. Thus, the two-level switch 5 and buffer amplifier 8 serve to shape the differential signal $E_d$ and produce $E_{out}$.

The output of the buffer amplifier is applied via the delay element 3 to the input of the differential amplifier 1, as the signal $E_{fb}$, and so the effect of the differential amplifier is to compare the signals $E_{in}$ and $E_{fb}$. It will be noted that the output signal $E_{out}$ includes a string of pulses which are spaced from each other at intervals equal to about twice the time delay of the delay element 3, and that the duration of the string of pulses is equal to the duration of the input signal $E_{in}$.

Figure 3:
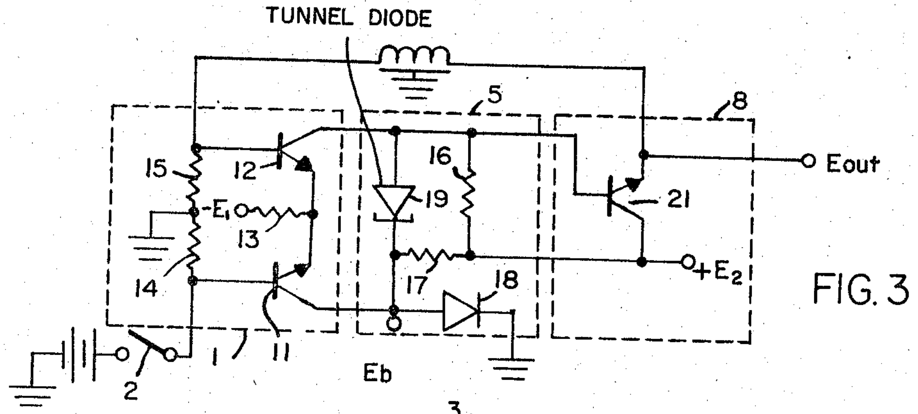
FIG. 3 illustrates one embodiment of the invention including simple circuit elements to perform the operations of the various parts thereof.

The functions of the various parts of the circuit in FIGURE 1, represented by the blocks, are all substantially binary in nature. At any particular instant during operation, each produces one of two output levels in response to one of two input conditions. Thus, these functions can be performed by relatively simple circuit elements and, conceivably, the functions of the differential amplifier 1, two-level switch 5, and the buffer amplifier 8 could be combined into a single unit. These functions are described separately herein to aid in understanding principle of operation of the circuit. FIG. 3 illustrates simple circuit elements for performing these functions. In FIG. 3, the differential amplifier 1 includes a pair of NPN type transistors 11 and 12 in common emitter configuration. The emitters of these transistors are connected and energized at a negative potential via the resistor 13. The input to transistor 11, $E_{in}$, is applied across input resistor 15. When switch 2 is open, the transistors 11 and 12 conduct about equally, and transistor 21 in buffer circuit 8 draws only sufficient leakage current so that the voltage drop from base to emitter is equal to $+E_b$ (this is the voltage drop across diode 18). During this condition, the forward drop through the tunnel diode 19 is negligible, and so $E_{out}$ is substantially at ground potential. In addition, the voltage drops across the resistors 16 and 17 in the switching circuit are about equal; they are substantially $E_2-E_b$. Subsequently, when switch 2 closes applying the signal $E_{in}$ to the base of transistor 11, transistor 11 conducts more than transistor 12, and in fact, the transistor 12 is substantially not conducting at this point. As a result, the voltage drop across resistor 16 in the switching circuit 5 decreases to a minimum and the potential at the base of transistor 21 increases sharply. This produces a relatively large forward biasing voltage across the tunnel diode 19, causing the diode to operate at its high conduction level, thus stabilizing the current flow and voltage drop across the resistor 16. The sharp increase in the potential at the base of transistor 21 causes the transistor to increase conduction and $E_{out}$ rises sharply and approaches $+E_2$ and a magnitude about twice the magnitude of $E_{in}$. This output is delayed by the time interval of delay 3 and energizes the base of transistor 12 as $E_{fb}$. Thus, transistor 12 increases conduction and transistor 11 decreases conduction. This increases the voltage drop across resistor 16, reducing the voltage at the base of transistor 21 and across tunnel diode 19, causing the diode to operate at its low conduction level, and thereby, stabilize the new relatively large voltage drop across resistor 16 causing transistor 21 conduction to decrease sharply. This cycle is repeated continually, so long as the input voltage $E_{in}$ is applied. The cycle repeats over an interval about twice the time interval of the delay 3.

Transistor 21 is selected and energized to produce the output signal $E_{out}$ in response to the two switching levels 6 and 7, which is at least twice the amplitude of the input control signal $E_{in}$, and as described above, this output is coupled to the input of the differential amplifier via the delay element 3 and is impressed across the resistor 15 at the input to the differential amplifier. Thus, at the output of the circuit in FIGURE 3, there is produced a string of pulses, each pulse being separated by an interval determined by the interval of the delay 3 and the duration of the string of pulses is equal to the duration of the input signal $E_{in}$. The feedback signal potential $E_{fb}$, as already described, may be of the same sign as the input signal potential $E_{in}$. However, the effect of the feedback signal is to oppose the conduction state of the differential amplifier 1. Accordingly, this feedback cannot be referred to as positive feedback in the same sense that positive feedback occurs in well-known oscillator circuits. In fact, $E_{fb}$ could be referred to as negative feedback.

In some applications, it is required to vary both the interval between pulses and the duration of the string of signals or burst. For such application, the delay 3 could be replaced by an electronically controlled delay circuit, and the switch 2 could be replaced by an electronic switch. Thus, both the duration of the burst and the interval between the pulses in the burst could be controlled electronically.

One particularly useful application of the circuit illustrated in FIGURE 3 is to provide bursts of clock pulses to a computer, which accompany binary information signals fed to the computer. For this type of application, delay 3 would be set to establish the desired clock pulse rate and the front end of the input signal $E_{in}$ would initiate a string of such clock pulses in synchronism with the information signals being fed to the computer. Thus, each burst of information signals fed to the computer would be accompanied by its own set of clock pulses and there would not have to be synchronism or coherence between clock pulses for successive bursts of information signals fed to the computer.

Figure 4:
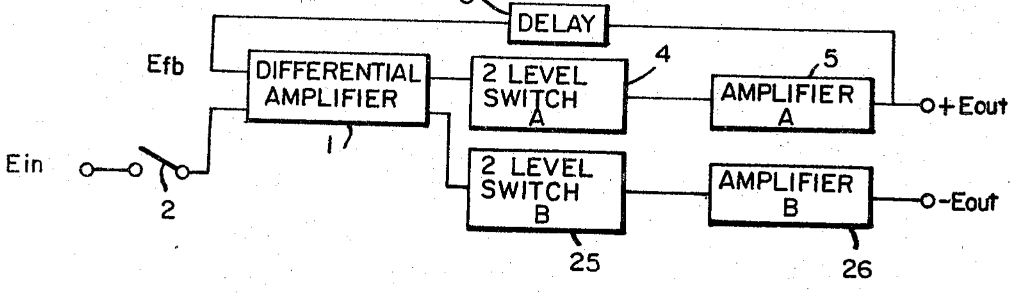
FIG. 4 illustrates another embodiment similar to that in FIG. 3 for producing positive and negative trains of pulses in response to the input signal.

For applications which require bursts of negative-going pulses, as well as bursts of positive-going pulses, the embodiment illustrated in FIGURE 4 is useful. This structure is very similar to the embodiment in FIGURE 1, including substantially the same elements operating as described with respect to FIGURES 1 and 2. The circuit includes the differential amplifier 1, controlled by an input signal $E_{in}$ from switch 2, and energizing a two-level switch 5, the output of which is amplified by the buffer amplifier 8 and fed back to the input of the differential amplifier via a delay 3. Thus, the output of the amplifier 8 is substantially as illustrated by the waveform in FIGURE 2*d*. In this case, a complementary output from the differential amplifier is applied to a second two-level switch 25, whose output is amplified by a second buffer amplifier 26, producing the negative-going string of pulses denoted minus $E_{out}$. If the differential amplifier here is constructed as illustrated in FIGURE 3, the complementary output is obtained from a resistor coupled to the collector of transistor 11 and a two-level switching circuit identical to circuit 5 in FIGURE 3 could be employed as the two-level switching circuit 25.

This completes descriptions of a few embodiments and uses of the present invention, which includes means for comparing an input signal level with a feedback signal level, producing a difference signal level for energizing switching means and means for amplifying the output of the switching means and delaying the output to produce the feedback signal so that the switching means continually switches between two levels at a rate determined by the period of delay and for a period of time determined by the interval of the input signal. The specific details of embodiments of the invention described herein are made by way of example and should not limit the spirit and scope of the invention, as set forth in the accompanying claims.

I claim:

1. A signal generator comprising, means for producing a substantially steady D.C. input signal, means for comparing signals producing an output representative of the difference between magnitudes of said compared signals, switching means responsive to said comparing means for producing first and second different signal levels during a pulse train, means for delaying said different signal levels, and means for coupling of delayed different signal levels to said comparing means, whereby said comparing means responds to said steady D.C. signal and said first delayed signal level to produce said output which causes such switching means to switch to said second signal level, and also responds to said steady D.C. signal and said second delayed signal level to produce said output which causes said switching means to switch to said first signal level.

2. A signal generator as in claim 1, and in which, said first delayed signal level, which is coupled to said comparing means is positive with respect to said steady D.C. input signal and said second delayed signal level, which is coupled to said comparing means is negative with respect to steady D.C. level.

3. A signal generator as in claim 1, and in which, the amplitude of one of said delayed signal levels which is coupled to said comparing means is greater than the amplitude of said steady D.C. input signal, and the amplitude of the other of said delayed signal levels which is coupled to said comparing means is less than the amplitude of said steady D.C. input signal.

4. A pulse generator as in claim 1, and in which, the magnitude of one of said delayed signal levels which is coupled to said comparing means is at least twice the magnitude of said steady D.C. input signal.

5. A signal generator as in claim 4, and in which, the other of said delayed signal levels which is coupled to said comparing means is of magnitude less than the magnitude of said steady D.C. input signal.

6. A signal generator as in claim 1, and in which, the interval of said means for delaying is such that a signal level is coupled from the output to the input of said comparing means in substantially one half the interval between pulses in said pulse train.

7. A signal generator as in claim 1, and in which, the interval of said means for delaying is substantially less than the interval between pulses in said pulse train.

8. A signal generator as in claim 4, and in which, the interval of said means for delaying is such that a signal level is coupled from the output to the input of said comparing means in substantially one half the interval between pulses in said pulse train.

9. A circuit for producing bursts of pulses comprising means for producing a substantially steady input signal of interval coincident with the interval of said burst of pulses, means for comparing signals producing an output representative of the difference between magnitudes of said compared signals, switching means responsive to said comparing means for producing first and second different signal levels during said coincident interval, defining said burst of pulses.

means for delaying said different signal levels, and means for coupling said delayed different signal levels to said comparing means, whereby said comparing means respond to said steady D.C. signal and said first delayed signal level to produce said output, which causes said switching means to switch to said second signal level and also responds to said steady D.C. signal and said second delayed signal level to produce said output which causes said switching means to switch to said first signal level.

10. A circuit as in claim 9, and in which, the higher of said delayed signal levels is at least twice the amplitude of said steady D.C. input signal, and the interval of said delaying means is such that the signal level is coupled from the output to the input of said comparing means in substantially one half the interval between pulses in said burst.

References Cited by the Examiner

UNITED STATES PATENTS

| | | | |
|---|---|---|---|
| 3,089,089 | 5/1963 | Rhodes | 328—56 |
| 3,196,358 | 7/1965 | Bagley | 328—56 |
| 3,206,686 | 9/1965 | Goor | 328—55 |
| 3,215,854 | 11/1965 | Mayhew | 307—88.5 |
| 3,222,543 | 12/1965 | Moy et al. | 328—55 |
| 3,223,981 | 12/1965 | Fischer | 328—55 |

ROY LAKE, *Primary Examiner.*

JOHN KOMINSKI, *Examiner.*